US012228087B2

(12) United States Patent
Dixon et al.

(10) Patent No.: US 12,228,087 B2
(45) Date of Patent: Feb. 18, 2025

(54) SYSTEM FOR CONTROLLING AN ELECTRONIC THROTTLE BODY

(71) Applicant: Walbro LLC, Cass City, MI (US)

(72) Inventors: Andreas D. Dixon, Cass City, MI (US); Bradley J. Roche, Millington, MI (US)

(73) Assignee: Walbro LLC, Cass City, MI (US)

( * ) Notice: Subject to any disclaimer, the term of this patent is extended or adjusted under 35 U.S.C. 154(b) by 0 days.

(21) Appl. No.: 18/280,409

(22) PCT Filed: Mar. 24, 2022

(86) PCT No.: PCT/US2022/021656
§ 371 (c)(1),
(2) Date: Sep. 5, 2023

(87) PCT Pub. No.: WO2022/204354
PCT Pub. Date: Sep. 29, 2022

(65) Prior Publication Data

US 2024/0301837 A1 Sep. 12, 2024

Related U.S. Application Data

(60) Provisional application No. 63/166,668, filed on Mar. 26, 2021.

(51) Int. Cl.
*F02D 41/14* (2006.01)
*F02D 41/20* (2006.01)

(52) U.S. Cl.
CPC ......... *F02D 41/1401* (2013.01); *F02D 41/20* (2013.01); *F02D 2041/1432* (2013.01); *F02D 2041/202* (2013.01)

(58) Field of Classification Search
CPC ................ F02D 41/1401; F02D 41/20; F02D 2041/1432; F02D 2041/202
See application file for complete search history.

(56) References Cited

U.S. PATENT DOCUMENTS 4,872,435 A 10/1989 Ueyama et al.
4,873,960 A * 10/1989 Kamifuji ............ F02D 41/2409 123/480

(Continued)

FOREIGN PATENT DOCUMENTS

JP 2015082699 A 4/2015
KR 2020090008529 U 8/2009

(Continued)

OTHER PUBLICATIONS

International Preliminary Report on Patentability for PCT/US2022/021656 dated Oct. 5, 2023, 7 pages.

(Continued)

*Primary Examiner* — Joseph J Dallo
(74) *Attorney, Agent, or Firm* — Day Pitney LLP; George Chaclas

(57) ABSTRACT

A system for controlling an electronic throttle body includes an engine speed setting device having a first terminal coupled to a source for a reference voltage, a second terminal coupled to a first end of a conductor and means for varying a level of resistance between the first and second terminals. The level of resistance is indicative of a desired engine speed. The second terminal outputs an analog engine speed signal indicative of the desired engine speed on the conductor. An electronic control module includes an engine speed signal processing circuit including a resistor coupled between a node located between the first and second ends of the conductor and one of a voltage supply and a voltage return. A controller coupled to the second end of the conductor is configured to generate a control signal for the electronic throttle body responsive to the engine speed signal.

12 Claims, 4 Drawing Sheets

(56) References Cited

U.S. PATENT DOCUMENTS

| | | | | | |
|---|---|---|---|---|---|
| 4,960,093 | A * | 10/1990 | McDougal | F02P 5/155 | 123/643 |
| 4,993,371 | A * | 2/1991 | McDougal | F02P 5/155 | 123/406.2 |
| 5,029,567 | A * | 7/1991 | McDougal | F02P 17/00 | 123/406.21 |
| 5,085,192 | A * | 2/1992 | McDougal | F02P 17/00 | 123/406.2 |
| 5,133,322 | A * | 7/1992 | McDougal | F02P 5/1522 | 123/406.3 |
| 2002/0011815 | A1 | 1/2002 | Gaffney et al. | | |
| 2003/0107351 | A1* | 6/2003 | Taniguchi | F02D 29/06 | 322/36 |
| 2005/0225191 | A1* | 10/2005 | Walker | H02K 21/222 | 310/156.43 |
| 2008/0277945 | A1* | 11/2008 | Lorenz | H02J 7/0031 | 307/64 |
| 2010/0010684 | A1* | 1/2010 | Lorenz | H02J 7/0031 | 307/64 |
| 2012/0175876 | A1* | 7/2012 | Pendray | H02P 9/102 | 290/41 |
| 2017/0025976 | A1 | 1/2017 | Tsai | | |

FOREIGN PATENT DOCUMENTS

| | | | | |
|---|---|---|---|---|
| WO | WO-2005091874 | A2 * | 10/2005 | H02K 31/02 |
| WO | WO-2010134994 | A1 * | 11/2010 | F02D 19/02 |
| WO | WO-2019205205 | A1 * | 10/2019 | F02B 1/06 |

OTHER PUBLICATIONS

Written Opinion & International Search Report for PCT/US2022/021656 dated Jul. 6, 2022, 10 pages.

* cited by examiner

SYSTEM FOR CONTROLLING AN ELECTRONIC THROTTLE BODY

REFERENCE TO RELATED APPLICATIONS

This application claims the benefit of U.S. Provisional Application Ser. No. 63/166,668 filed on Mar. 26, 2021 the entire content of which is incorporated herein by reference in its entirety.

TECHNICAL FIELD

The present disclosure relates generally to a system for controlling an electronic throttle body.

BACKGROUND

Many conventional devices used in lawn and garden applications and in other applications employ an engine with an electronic throttle body that may be controlled to vary the speed of the engine. Conventional control systems for the electronic throttle body, however, suffers from several deficiencies. For example, conventional control systems include a relatively large number of components (e.g., voltage regulators, protection circuits) and wires and are therefore relatively complex and expensive. Conventional control systems are also difficult to configure and can only assume a limited number of configurations. As a result, a single control system often cannot be used with different products and must be customized for each product. Further, conventional systems limit the ability of end users of a product to vary engine speed.

The inventors herein have recognized a need for a system for controlling an electronic throttle body that will minimize and/or eliminate one or more of the above-identified deficiencies.

SUMMARY

A system for controlling an electronic throttle body in accordance with one embodiment includes an engine speed setting device comprising a first terminal coupled to a source for a reference voltage, a second terminal coupled to a first end of a conductor, and means for varying a level of resistance between the first and second terminals. The level of resistance is indicative of a desired engine speed. The second terminal outputs an analog engine speed signal indicative of the desired engine speed on the conductor. The system further includes an electronic control module. The module comprises an engine speed signal processing circuit including a resistor coupled between a node located between the first end and a second end of the conductor and one of a voltage supply and a voltage return. The module further includes a controller coupled to the second end of the conductor and configured to generate a control signal for the electronic throttle body responsive to the engine speed signal.

A system for controlling an electronic throttle body in accordance with another embodiment includes an engine speed setting device comprising a first terminal coupled to a source for a reference voltage, a second terminal coupled to a first end of a conductor, and means for varying a level of resistance between the first and second terminals. The level of resistance is indicative of a desired engine speed. The second terminal outputs an analog engine speed signal indicative of the desired engine speed on the conductor. The system further includes an electronic control module. The module comprises an engine speed signal processing circuit including a resistor coupled between a node located between the first end and a second end of the conductor and one of a voltage supply and a voltage return. The module further includes a controller coupled to the second end of the conductor. The controller is configured to measure a voltage of the engine speed signal and a voltage of the voltage supply and to generate a control signal for the electronic throttle body responsive to a ratio of the voltage of the engine speed signal and the voltage of the voltage supply.

A system for controlling a motor in accordance with another embodiment includes an input device comprising a first terminal coupled to a source for a reference voltage, a second terminal coupled to a first end of a conductor, and means for varying a level of resistance between the first and second terminals. The level of resistance is indicative of a desired speed or position of the motor. The second terminal outputs an analog signal indicative of the desired speed or position of the motor on the conductor. The system further includes an electronic control module. The module comprises a signal processing circuit including a resistor coupled between a node located between the first end and a second end of the conductor and one of a voltage supply and a voltage return. The module further includes a controller coupled to the second end of the conductor and configured to generate a control signal for the motor responsive to the analog signal.

A system for controlling an electronic throttle body in accordance with the disclosure herein represents an improvement as compared to conventional systems. In particular, a system in accordance with the disclosure includes fewer component and wires than conventional systems and is therefore less complex and less expensive. A system in accordance with the disclosure can also be easily configured-both for use with a wide variety of different products and by end users of those products thereby allowing greater variation and control of engine speed.

BRIEF DESCRIPTION OF THE DRAWINGS

The following detailed description of certain embodiments and best mode will be set forth with reference to the accompanying drawings, in which.

DETAILED DESCRIPTION

Figure 1:
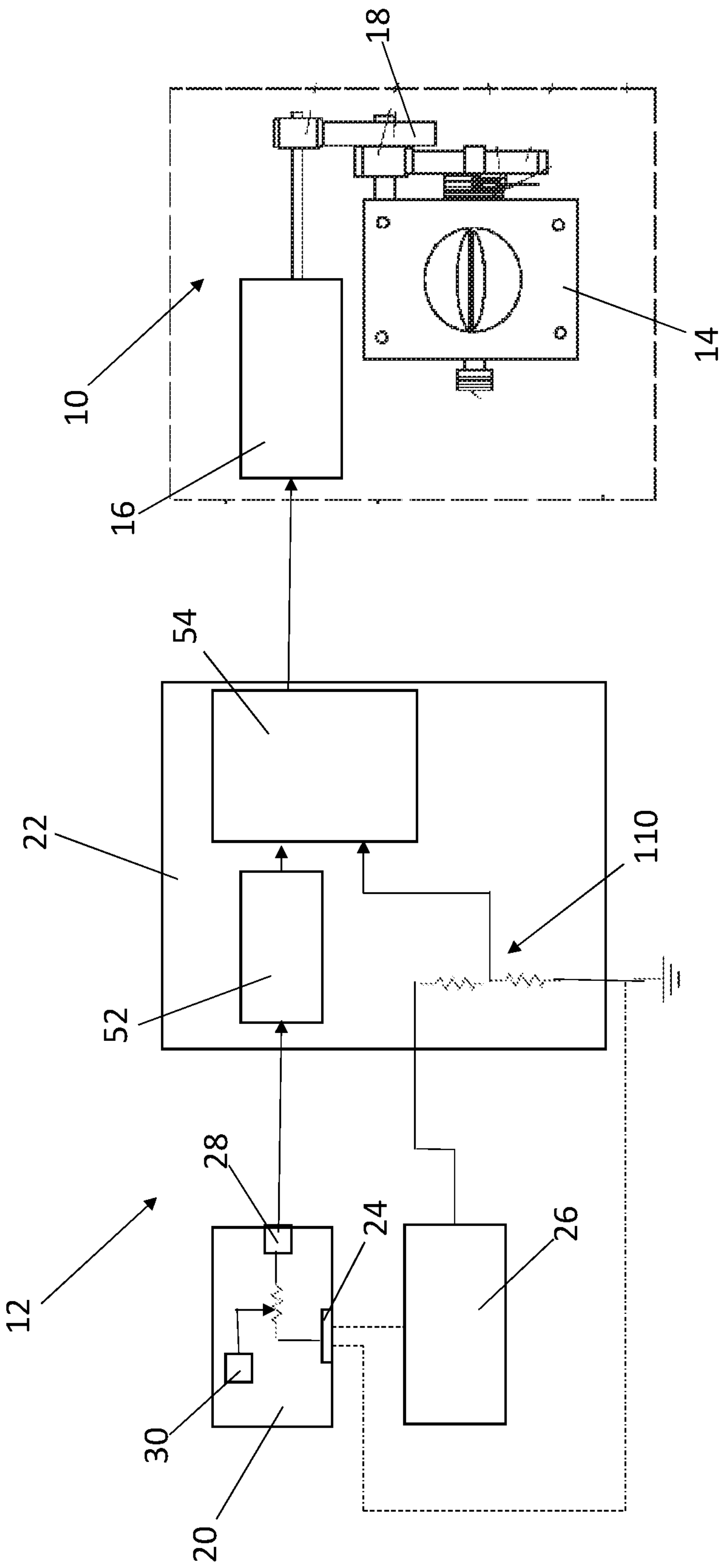
FIG. 1 shows a diagrammatic view of an electronic throttle body and a system for controlling the electronic throttle body.

Referring now to the drawings wherein like reference numerals are used to identify identical components in the various views, FIG. 1 illustrates an electronic throttle body (ETB) 10 and a system 12 for controlling ETB 10. ETB 10 is provided to control the volume of air supplied to a combustion engine (not shown). The engine may comprise a light-duty combustion engine such as a single cylinder two-stroke or four-stroke gasoline powered internal combustion engine of the type commonly used to power devices such as gasoline-powered hand-held power tools, lawn and garden equipment, lawnmowers, weed trimmers, edgers, chain saws, snowblowers, personal watercraft, boats, snowmobiles, motorcycles, all-terrain-vehicles, etc. It should be understood, however, that ETB 10 and system 12 may also be used in connection with other types of combustion engines including multi-cylinder combustion engines and in connection with other applications including automotive applications. ETB 10 controls the volume of air supplied to the engine cylinder or cylinders in the engine. ETB 10 includes a throttle valve 14, a motor 16 and a gear train 18 for transferring torque from motor 16 to valve 14. Valve 14 is opened and closed by motor 16 to control delivery of air to the engine and, as a result, the speed and output torque of the engine. Conventional systems for controlling motor 16 and, therefore, ETB 10 communicate with motor 16 over a controller area network (CAN). Use of a CAN, however, typically requires that the control system include a large number of components including microcontrollers, transceivers and voltage regulators. Therefore, conventional control systems are relatively expensive. Existing lower cost control systems still require the use of a voltage regulator and associated protection circuitry to supply a reference voltage to the electronic control module of the system and a relatively large number of wires and, therefore, are still relatively expensive. System 12 provides a control system for ETB 10 that is less costly than conventional control systems and that is easily configurable and scalable. In particular, system 12 allows control of ETB 10 without the use of transceivers, voltage regulators and other components found in conventional control systems. System 12 also reduces the number of wires and connections found in conventional systems and reduces potential failure modes for the system. System 12 further enables users to easily configure system 12 for use with a wide variety of systems thereby facilitating intelligent control of ETB 10 for a greater number of users.

System 12 provides a low-cost, easily configurable and scalable system for controlling ETB 10. System 12 may include means, such as an engine speed setting device 20, for setting the speed of the engine, and an electronic control module 22.

Figure 2B:
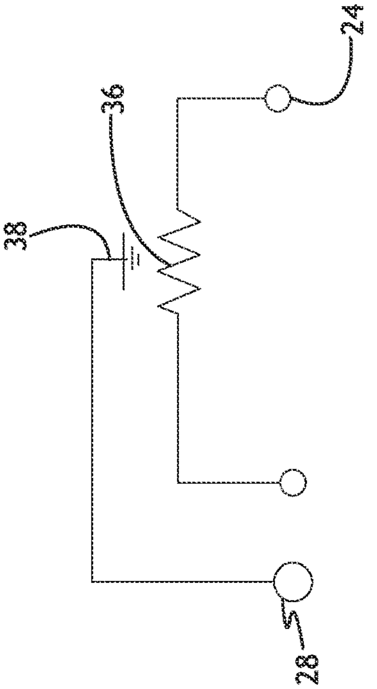
FIGS. 2A-C are diagrammatic views of several embodiments of an engine speed setting device of the system of FIG. 1.
Figure 2C:
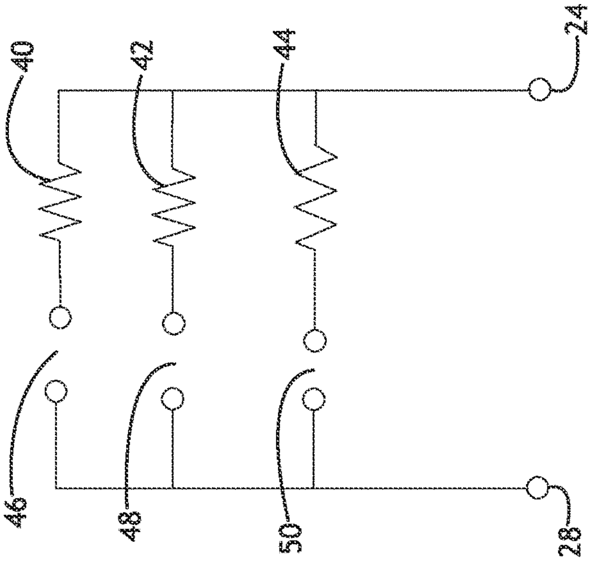
Figure 2A:
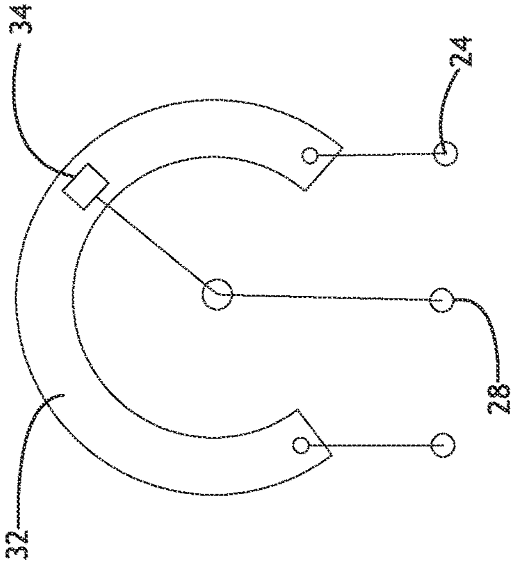

Engine speed setting device 20 provides a means for a user to indicate a desired engine speed and, ultimately, set the speed of the engine. Device 20 is an analog device that generates an analog engine speed signal indicative of the desired engine speed. In accordance with one aspect of the disclosed system, device 20 is coupled to other components of system 12 by only two wires or other conductors. Device 20 includes one terminal 24 that is coupled to a source for a reference voltage by one conductor. The reference voltage may comprise, for example, the system voltage for system 12 as provided by a power source 26 such as a battery or capacitor. Alternatively, the reference voltage may comprise a common ground for system 12. Device 20 further includes a terminal 28 that is coupled to one end of another conductor on which device 20 outputs the engine speed signal. Device 20 further includes means 30, including potentiometers, switches and associated actuators such as levers, push buttons and other actuators, for varying a level of resistance between terminals 24, 28. The level of resistance between terminals 24, 28 is indicative of a desired engine speed. For example, engines in certain applications may have a limited number of engine speed settings including idle (turtle), max (rabbit), and one or more intermediary settings. Means 30 may be used to establish a level of resistance between terminals 24, 28 indicative of one of the potential engine speed settings. As a result, the engine speed signal output on terminal 28 will have a voltage indicative of the chosen engine speed setting and the desired engine speed. Referring to FIGS. 2A-2C, device 20 may assume a variety of forms. Referring to FIG. 2A, in one embodiment, the means for varying the level of resistance between terminals 24, 28 may comprise a potentiometer 32 including a lever or knob (not shown) through which a user can adjust the position of a rotating contact 34 or wiper of the potentiometer 32. Referring to FIG. 2B, in another embodiment, the means for varying the level of resistance between terminals 24, 28 may comprise a potentiometer 36 including a handle (not shown) through which a user can adjust the position of a sliding contact 38 or wiper. Referring to FIG. 2C, in another embodiment, the means for varying the level of resistance between terminals 24, 28 may comprise a plurality of resistors of varying resistance such as resistors 40, 42, 44 and corresponding switches 46, 48, 50 arranged in parallel between terminals 24, 28. The means may further include one or more push buttons (not shown) or other actuators through which a user may open and close switches 46, 48, 50. It should be understood that the number of resistors and switches may vary depending on the number of possible engine speed settings.

Referring again to FIG. 1, electronic control module 22 is provided to generate control signals for motor 16 of ETB 10. Module 22 may include an engine speed signal processing circuit 52 and a controller 54.

Figure 3:
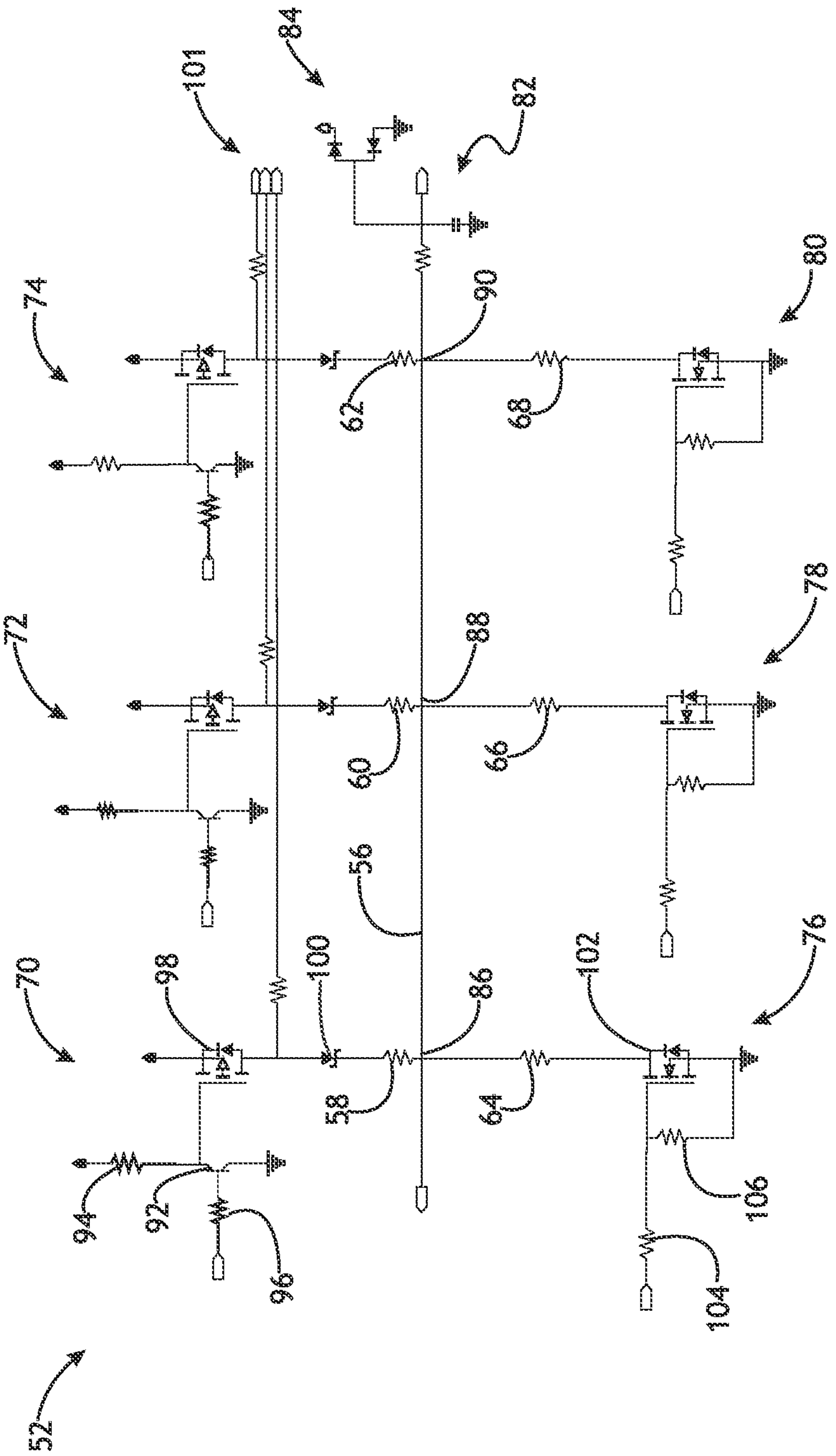
FIG. 3 is a schematic diagram of one embodiment of an engine speed signal processing circuit of the system of FIG. 1.

Engine speed signal processing circuit 52 is provided to process the analog engine speed signal output by engine speed setting device 20. Referring now to FIG. 3, the engine speed signal is carried on a wire or other conductor 56 having one end connected to terminal 28 of device 20 and another end coupled to an input pin or terminal of microcontroller 54. In one embodiment, circuit 52 may include one or more pull up resistors 58, 60, 62, one or more pull down resistors 64, 66, 68, activation circuits 70, 72, 74 for pull up resistors 58, 60, 62, and activation circuits 76, 78, 80 for pull down resistors 64, 66, 68. Circuit 52 may also include a low-pass filter 82 for filtering high frequencies on conductor 56 and a Schottky barrier diode 84 to limit the voltage on conductor 56 and provide protection against transient voltages and electro-static discharge.

Pull-up resistors 58, 60, 62 and provided to pull up the voltage on conductor 56 to the system voltage for system 12 or another regulated voltage when the reference voltage for device 20 comprises the common ground for system 12. Each pull-up resistor 58, 60, 62 is coupled between a node 86, 88, 90, respectively, on conductor 56 between the ends of conductor 56 and a voltage supply such as the system voltage for system 12 or another regulated voltage.

Pull-down resistors 64, 66, 68 are provided to pull down the voltage on conductor 56 to the common ground for system 12 when the reference voltage for device 20 comprises the system voltage for system 12. Each pull-down resistor 64, 66, 68 is coupled between a corresponding node 86, 88, 90 and a voltage return (i.e., the common ground for system 12).

In accordance with one aspect of the disclosed system 12, pull-up resistors 58, 60, 62 and pull-down resistors 64, 66, 68 have different resistance values to permit use of module 22 with various types of engine speed setting devices 20 and, in particular, devices 20 having different ranges of resistance. For example, resistors 58, 64 may have a value configured for use with a device 20 having a range of resistance of 1000 Ohms, while resistors 60, 66 have a value ten times greater than the resistance of resistors 58, 64 such that resistors 60, 66 are configured for use with a device 20 having a range of resistance of 10000 Ohms and resistors 62, 68 have a value ten times greater than the resistance of resistors 60, 66 such that resistors 62, 68 are configured for use with a device 20 having a range of resistance of 100000 Ohms. Devices 20 having a larger range of resistance can offer more distinct speed settings. It should be understood that the number of pull-up resistors and pull-down resistors may vary depending on the variety of engine speed setting devices 20 that module 22 is configured to be used with. In the simplest configuration, a single pull-up resistor or a single pull-down resistor may be used when both the range of resistance of device 20 is known and the reference voltage used by device 20 is known. System 12 is thus easily configurable and scalable for use with a wide variety of devices 20.

Activation circuits 70, 72, 74 are provided to select and activate a corresponding pull-up resistor 58, 60, 62 whenever the reference voltage for device 20 is such that the desired engine speed reflected in the engine speed signal from device 20 is represented by increases in voltage relative to reference voltage. The resistor 58, 60, 62 that is selected and activated will be based on the range of resistance within device 20. Likewise, activation circuits 76, 78, 80 are provided to select and activate a corresponding pull-down resistor 64, 66, 68 whenever the reference voltage for device 20 is such that the desired engine speed reflected in the engine speed signal from device 20 is represented by decreases in voltage relative to the reference voltage. The resistor 64, 66, 68 that is selected and activated will again be based on the range of resistance within device 20. Activation circuits 70, 72, 74, 76, 78, 80 help to enable the easy configuration and scaling of module 22 for use with various devices 20. Activation circuits 70 and 76, for example, enables use of module 22 with devices 20 that employ the system voltage as a reference voltage as well as devices 20 that employ a common ground as the reference voltage. Additional activation circuits 74, 76, 78, 80 enable use of module 22 with devices 20 having varying ranges of resistance. The operation of activation circuits 70, 72, 74, 76, 78, 80 may be controlled by controller 54 or another controller to select and activate the appropriate pull-up or pull-down resistor 58, 60, 62, 64, 66, 68. Each activation circuit 70, 72, 74 includes an electrically activated switch. In the illustrated embodiment, the switch comprises a transistor 92 such as a NPN bipolar junction transistor (BJT) having a collector coupled to the system voltage through a resistor 94, an emitter coupled to ground and a base coupled to a terminal configured to receive an activation command from the controller 54 through a resistor 96. The collector may further be coupled to the gate of a p-channel enhancement field effect transistor 98 that has its source coupled to the system voltage and its drain coupled to a corresponding pull-up resistor through Schottky diode 100. Circuit 52 may include conductors coupled to the drain of each transistor 98 that output signals to controller 54 through output pins 101 enabling controller 54 to increase accuracy by determining the voltage drop across transistor 98, determine the voltage source powering transistor 98, and perform diagnostic operations (e.g., by requesting activation of circuit 70, 72, 74 and evaluating voltage levels at the drain of transistor 98) among other functions. Likewise, each of activation circuits 76, 78, 80 includes an electrically activated switch. In the illustrated embodiment, each activation circuit 76, 78, 80 may include an n-channel enhancement field effect transistor (FET) 102. The transistor 102 may have a gate coupled to a node of a voltage divider including resistors 104, 106 that is in turn coupled to a terminal configured to receive an activation command from the controller 54. The source of the transistor 102 may be coupled to ground and the drain may be coupled to a corresponding pull-down resistor. Although specific embodiments of activation circuits 70, 72, 74, 76, 78, 80 are illustrated in FIG. 3, it should be understood that circuits 70, 72, 74, 76, 78, 80 could be configured in a variety of ways including through the use of drivers, relays and silicon-controlled rectifiers (SCRs).

Figure 4:
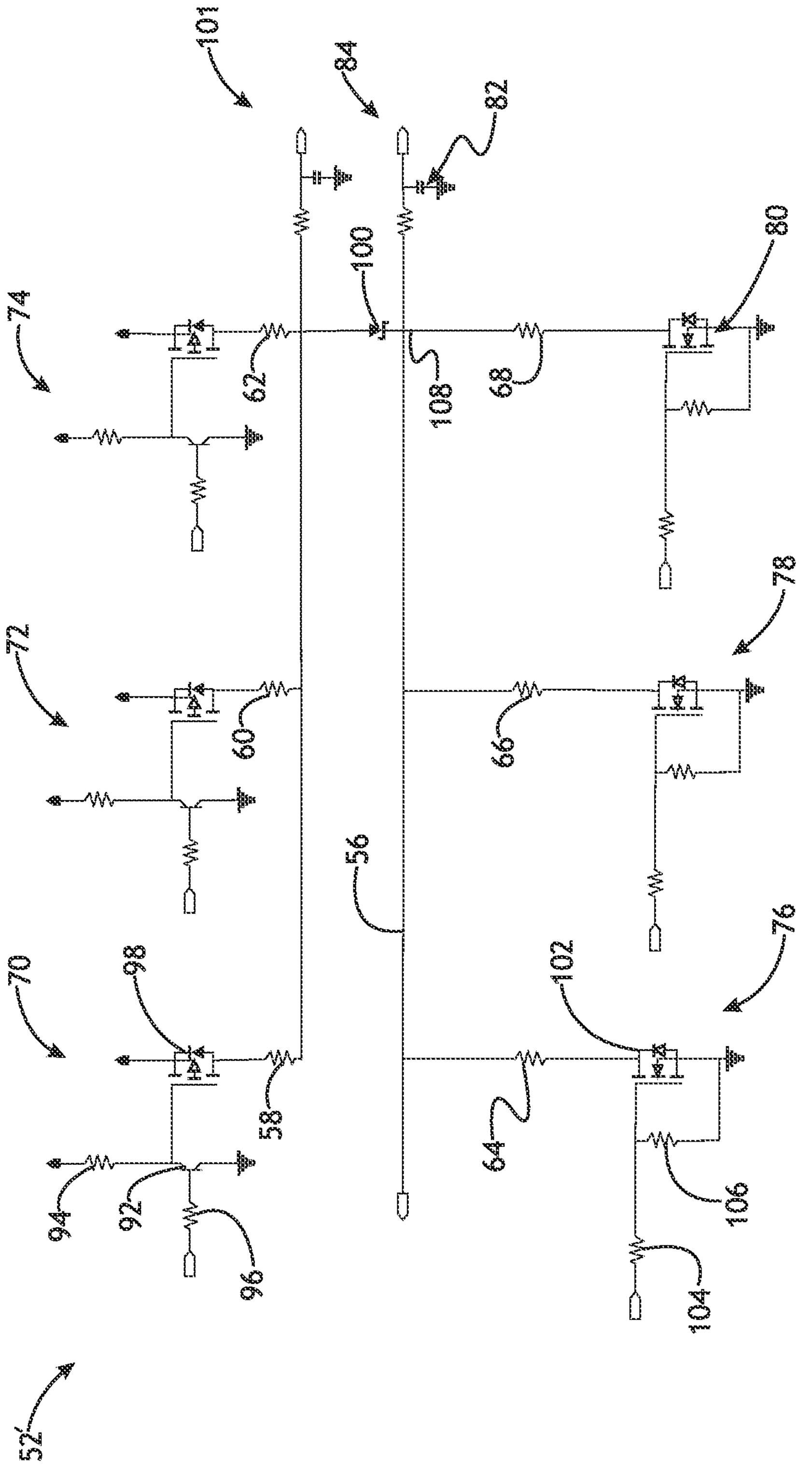
FIG. 4 is a schematic diagram of an alternative embodiment of an engine speed signal processing circuit of the system of FIG. 1.

Referring now to FIG. 4, another embodiment of an engine speed signal processing circuit 52' is illustrated. Circuit 52' is substantially similar to circuit 52 and a description of like components is set forth above. Circuit 52' differs from circuit 52 in that resistors 58, 60, 62 are coupled between a common node 108 on conductor 56 between the ends of conductor 56 and a voltage supply such as the system voltage for system 12 or another regulated voltage while resistors 64, 66, 68 are coupled to the same common node 108 on conductor 56 between the ends of conductor 56 and a voltage return (i.e., the common ground for system 12). By eliminating several conductors, connections and components (e.g., additional diodes 100) relative to circuit 52, circuit 52' can further reduce the overall cost of system 12. Unlike circuit 52, however, circuit 52' is unable to directly monitor each individual pull up resistor 58, 60, 62 and activation circuit 70, 72, 74 for potential faults. Circuit 52 enables individual monitoring of resistors 58, 60, 62 and activation circuits 70, 72, 74, improved accuracy relative to circuit 52' and is less subject to tolerances in the connection to controller 54 than circuit 52' (albeit with more cost).

Referring again to FIG. 1, controller 54 is provided to generate control signals for motor 16 of ETB 10 responsive to the analog engine speed signal generated by device 20 and processed by engine speed signal processing circuit 52 or 52'. Controller 54 may comprise a programmable microprocessor or microcontroller or may comprise application specific integrated circuits (ASIC). Controller 54 may include a memory and a central processing unit (CPU). Controller 54 may also include an input/output (I/O) interface including a plurality of input/output pins or terminals through which the controller 54 may receive a plurality of input signals and transmit a plurality of output signals. The input signals may include signals received from circuit 52 or 52' as well as a signal indicative of the voltage level of power source 26. The latter signal may be processed through a voltage divider 110 to limit the voltage to a level suitable for controller 54. The output signals may include control signals used to control motor 16 of ETB 10. Controller 54 may be configured with appropriate programming instructions (i.e., software or a computer program) to implement several steps in a method for controlling the ETB 10.

In accordance with one aspect of the disclosed system, controller 54 may generate control signals for motors 16 of ETB 10 responsive to a ratio of the voltage of the engine speed signal from engine speed setting device 20 and the voltage from power source 26. Analog to digital converters in controller 54 are configured to convert the analog signals received from device 20 and voltage divider 110 into digital signals from which the ratio is computed. By using a ratio of the voltage levels of signals from device 20 and voltage divider 110—signals which are generated contemporaneously, if not simultaneously—controller 54 eliminates the effects of transient noise within system 12 that may produce voltage levels in the engine speed signal that vary from levels associated with a particular engine speed.

Once the ratio of voltage levels for the engine speed signal and the signal from voltage divider 110 is computed, controller 54 may associate or categorize the ratio to determine the control signals for motor 16 of ETB 10. In particular, in certain embodiments, the range of potential values for the ratio may be divided into discrete sub-ranges, each of which may be associated with a particular engine speed (e.g., in a look-up table or other data structure within a memory of controller 54). The sub-ranges may be computed either dynamically by an algorithm in controller 54 or statically by an engineer or another person and hard coded into controller 54. The number of possible sub-ranges will be determined by the resolution of the analog to digital converters in controller 54, and the tolerance of the total system resistance seen by controller 54 (including the resistances of the resistors in engine speed setting device 20, pull-up resistors 58, 60, 62 and pull-down resistors 64, 66, 68). Controller 54 may compare the ratio to the sub-ranges and categorize the ratio as falling within one of the sub-ranges to determine the intended engine speed. Controller 54 may then generate a control signal for motor 16 of ETB 10 based on the sub-range that the ratio falls within.

In the embodiment described above, system 12 is used to control an ETB 10. It should be understood, however, that system 12 could be employed in a variety of applications in which a motor is controlled in response to user input. For example, system 12 may be used to control the operation of electric or hydraulic motors including the speed and position of such motors. System 12 may therefore also be used to control the operation of systems that are driven by such motors including, e.g., control of the volume of a geometric shape (e.g. by controlling the position of a valve or rod), control of the flow or gas, liquids, or solids (e.g., by controlling the position of a valve), and control of vehicle drive-by-wire systems (e.g., through control of hydraulic actuators or levers used on hydrostatic drive mechanisms). It should be understood that the nature of input device 20 may vary depending on the application for system 12.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A system for controlling an electronic throttle body, comprising:

an engine speed setting device, comprising a first terminal coupled to a source for a reference voltage;

a second terminal coupled to a first end of a conductor; and means for varying a level of resistance between the first and second terminals, the level of resistance indicative of a desired engine speed and the second terminal outputting an analog engine speed signal indicative of the desired engine speed on the conductor; and, an electronic control module, comprising an engine speed signal processing circuit including a first resistor coupled between a first node located between the first end and a second end of the conductor and one of a voltage supply and a voltage return; and, a controller coupled to the second end of the conductor and configured to generate a control signal for the electronic throttle body responsive to the engine speed signal, wherein the engine speed signal processing circuit includes a second resistor coupled between the first node and the other of the voltage supply and the voltage return, and wherein the engine speed signal processing circuit includes a first activation circuit for the first resistor configured to control current flow from the one of the voltage supply and the voltage return through the first resistor and a second activation circuit for the second resistor configured to control current flow from the other of the voltage supply and the voltage return through the second resistor.

2. The system of claim 1 wherein the engine speed signal processing circuit includes a second resistor coupled between a second node located between the first and second ends of the conductor and the one of the voltage supply and the voltage return.

3. The system of claim 2 wherein the second resistor has a resistance that differs from the resistance of the first resistor.

4. A system for controlling an electronic throttle body, comprising:

an engine speed setting device, comprising a first terminal coupled to a source for a reference voltage;

a second terminal coupled to a first part of a conductor; and means for varying a level of resistance between the first and second terminals, the level of resistance indicative of a desired engine speed and the second terminal outputting an analog engine speed signal indicative of the desired engine speed on the conductor; and, an electronic control module, comprising an engine speed signal processing circuit including a first resistor coupled between a first node located between the first part and a second part of the conductor and one of a voltage supply and a voltage return; and a controller coupled to the second part of the conductor, the controller configured to measure a voltage of the engine speed signal and a voltage of the voltage supply and to generate a control signal for the electronic throttle body responsive to a ratio of the voltage of the engine speed signal and the voltage of the voltage supply, wherein the engine speed signal processing circuit includes a second resistor coupled between the first node and the other of the voltage supply and the voltage return, and wherein the engine speed signal processing circuit includes a first activation circuit for the first resistor configured to control current flow from the one of the voltage supply and the voltage return through the first resistor, and a second activation circuit for the second resistor configured to control current flow from the other of the voltage supply and the voltage return through the second resistor.

5. The system of claim 4 wherein the engine speed signal processing circuit includes a second resistor coupled between a second node located between the first and second parts of the conductor and the one of the voltage supply and the voltage return.

6. The system of claim 5 wherein the second resistor has a resistance that differs from the resistance of the first resistor.

7. A system for controlling a motor, comprising:

an input device, comprising a first terminal coupled to a source for a reference voltage;

a second terminal coupled to a conductor; and means for varying a level of resistance between the first and second terminals, the level of resistance indicative of a desired speed or position of the motor and the second terminal outputting an analog signal indicative of the desired speed or position of the motor on the conductor; and, an electronic control module, comprising a signal processing circuit including a first resistor coupled between a first node located between the connection of the second terminal and the conductor and a second portion of the conductor and one of a voltage supply and a voltage return; and, a controller coupled to the second portion of the conductor and configured to generate a control signal for the motor responsive to the analog signal, wherein the signal processing circuit includes a second resistor coupled between the first node and the other of the voltage supply and the voltage return, and wherein the signal processing circuit includes a first activation circuit for the first resistor configured to control current flow from the one of the voltage supply and the voltage return through the first resistor and a second activation circuit for the second resistor configured to control current flow from the other of the voltage supply and the voltage return through the second resistor.

8. The system of claim 7 wherein the signal processing circuit includes a second resistor coupled between a second node located between the first and second ends of the conductor and the one of the voltage supply and the voltage return.

9. The system of claim 8 wherein the second resistor has a resistance that differs from the resistance of the first resistor.

10. The system of claim 1 wherein the means for varying a level of resistance includes one or more potentiometers, one or more resistors and corresponding switches, or both.

11. The system of claim 4 wherein the means for varying a level of resistance includes one or more potentiometers, one or more resistors and corresponding switches, or both.

12. The system of claim 7 wherein the means for varying a level of resistance includes one or more potentiometers, one or more resistors and corresponding switches, or both.

* * * * *